US008130973B2

(12) United States Patent
Uetake et al.

(10) Patent No.: US 8,130,973 B2
(45) Date of Patent: Mar. 6, 2012

(54) SUPERDIRECTIONAL ACOUSTIC SYSTEM AND PROJECTOR

(75) Inventors: Akihito Uetake, Hachioji (JP); Kinya Matsuzawa, Shiojiri (JP)

(73) Assignee: Seiko Epson Corporation (JP)

( * ) Notice: Subject to any disclaimer, the term of this patent is extended or adjusted under 35 U.S.C. 154(b) by 1447 days.

(21) Appl. No.: 11/630,590

(22) PCT Filed: Jun. 20, 2005

(86) PCT No.: PCT/JP2005/011682

§ 371 (c)(1),
(2), (4) Date: Dec. 22, 2006

(87) PCT Pub. No.: WO2006/001401

PCT Pub. Date: Jan. 5, 2006

(65) Prior Publication Data

US 2007/0274541 A1 Nov. 29, 2007

(30) Foreign Application Priority Data

Jun. 28, 2004 (JP) ................................ 2004-189867

(51) Int. Cl.
*H04B 3/00* (2006.01)
*H04R 3/00* (2006.01)
*H04R 25/00* (2006.01)
*H04R 1/20* (2006.01)

(52) U.S. Cl. .......... 381/77; 381/111; 381/116; 381/150; 381/337

(58) Field of Classification Search .............. 381/77–79, 381/111, 116, 117, 386, 150, 58–59
See application file for complete search history.

(56) References Cited

U.S. PATENT DOCUMENTS

| | | | | |
|---|---|---|---|---|
| 6,466,674 | B1 | 10/2002 | Norris | |
| 2004/0047477 | A1 | 3/2004 | Bank | |
| 2004/0264707 | A1 * | 12/2004 | Yang et al. | 381/77 |

FOREIGN PATENT DOCUMENTS

| | | |
|---|---|---|
| EP | 0973152 A | 1/2000 |
| JP | 60-254992 | 12/1985 |
| JP | 11-262084 | 9/1999 |
| JP | 2000-209691 | 6/2000 |
| JP | 2003-158788 | 5/2003 |

OTHER PUBLICATIONS

International Search Report and Written Opinion of ISA (in English) for PCT/JP2005/011682, mailed Oct. 10, 2005.

* cited by examiner

*Primary Examiner* — Devona Faulk
*Assistant Examiner* — George Monikang
(74) *Attorney, Agent, or Firm* — Harness, Dickey & Pierce, P.L.C.

(57) ABSTRACT

A superdirectional acoustic system for reproducing a sound signal supplied from a real sound source by using a superdirectional speaker and producing a virtual sound source in a vicinity of a sound wave reflection surface. The system includes an ultrasonic speaker, which includes an ultrasonic transducer for oscillating a sound wave in an ultrasonic frequency band, for reproducing an audio signal in a relatively medium to high frequency sound range, which is included in the sound signal supplied from the real sound source; and a low frequency sound reproducing speaker for reproducing an audio signal in a relatively low frequency sound range, which is included in the sound signal supplied from the real sound source. Sound in the medium-high frequency range is reproduced in a manner such that the sound is produced from a virtual sound source which is formed in the vicinity of the sound signal reflection surface such as a screen.

8 Claims, 6 Drawing Sheets

SUPERDIRECTIONAL ACOUSTIC SYSTEM AND PROJECTOR

TECHNICAL FIELD

The present invention relates to a superdirectional acoustic system and to a projector having an ultrasonic speaker.

Priority is claimed on Japanese Patent Application No. 2004-189867, filed Jun. 28, 2004, the content of which is incorporated herein by reference.

BACKGROUND ART

Due to the spread of DVDs (digital versatile disks), large-screen televisions, projectors, and the like, home theaters can now be readily enjoyed. In order to create a larger screen, images may be projected from a front projector onto a screen which is two to three meters from the projector, thereby producing a large 80- to 100-inch image.

In theaters, sound is as important as images, and at home there is a need to produce a sound source at the screen or in the vicinity of the screen as in the theater, so as to improve presence. Superdirectional acoustic systems have been developed, such as acoustic systems using ultrasonic speakers for producing a virtual sound source on a projector screen (see Japanese Unexamined Patent Application, First Publication No. S60-254992), and projectors which include ultrasonic speakers (see Japanese Unexamined Patent Application, First Publication No. H11-262084).

FIG. 7 shows the structure of a conventional ultrasonic speaker, which includes an audio frequency wave (signal) oscillating source 81 for generating a signal in an audio (or human-audible) frequency band, a carrier wave (signal) oscillating source 82 for generating a carrier wave (signal), a modulator 83, a power amplifier 84, and an ultrasonic transducer 85.

In the above structure, by using a signal output from the audio frequency wave oscillating source 81, the carrier wave in an ultrasonic frequency band, output from the carrier wave oscillating source 82, is modulated in the modulator 83, and the ultrasonic transducer 85 is driven by the modulated signal which has been amplified by the power amplifier 84. Accordingly, the modulated signal is converted by the ultrasonic transducer 85 into a sound wave having a finite amplitude level. The sound wave is emitted into a medium (i.e., the air), thereby reproducing the original signal sound at the original audio frequency due to the non-linear effect of the medium (i.e., the air).

In this case, the reproduction area of the reproduced signal in the audio frequency band is in the form of a beam extending from the ultrasonic transducer 85 along the emission axis.

FIGS. 8A and 8B show the structures of ultrasonic transducers used in conventional ultrasonic speakers. Most conventional ultrasonic transducers are resonant transducers using piezoelectric ceramics (i.e., an piezoceramic element) as an oscillation element. The ultrasonic transducers shown in FIGS. 8A and 8B perform both conversion of electrical signals into ultrasonic waves and conversion of ultrasonic waves into electrical signals (i.e., sending and receiving of the ultrasonic wave), by using a piezoceramic element as the oscillation element.

The bimorph ultrasonic transducer shown in FIG. 8A has two piezoceramic elements 91 and 92, a cone 93, a case 94, leads 95 and 96, and a screen 97. The piezoceramic elements 91 and 92 are adhered to each other, and the leads 95 and 96 are respectively connected to the faces of the piezoceramic elements 91 and 92, on the opposite sides of the adhesion faces.

The unimorph ultrasonic transducer shown in FIG. 8B has a piezoceramic element 101, a case 102, leads 103 and 104, inner wiring 105, and a glass member 106. The lead 103 is connected via the inner wiring 105 to the piezoceramic element 101 which is grounded via the case 102.

The resonant transducer uses a resonance phenomenon of piezoelectric ceramics; thus, preferable ultrasonic transmitting (and receiving) characteristics are obtained only in a relatively narrow frequency range in the vicinity of the resonance frequency, so that sound or tone quality is inferior.

On the other hand, when an audio signal is reproduced using a projector which has the above-explained ultrasonic speaker, the listener hears the reproduced sound which was reflected by the screen. However, the sound range which is reproducible using an ultrasonic speaker as a superdirectional speaker is limited to a relatively high frequency range. Therefore, the reproduced sound including relatively weak low frequency sound has inferior sound presence.

DISCLOSURE OF INVENTION

In view of the above circumstances, an object of the present invention is to provide a superdirectional acoustic system and a projector having an ultrasonic speaker, for producing sound or acoustic field environments in which greater sound presence can be realized.

Therefore, the present invention provides a superdirectional acoustic system for reproducing a sound signal supplied from a real sound source by using a superdirectional speaker and producing a virtual sound source in a vicinity of a sound wave reflection surface, the system comprising:

an ultrasonic speaker, which includes an ultrasonic transducer for oscillating a sound wave in an ultrasonic frequency band, for reproducing an audio signal in a relatively medium to high frequency sound range, which is included in the sound signal supplied from the real sound source; and a low frequency sound reproducing speaker for reproducing an audio signal in a relatively low frequency sound range, which is included in the sound signal supplied from the real sound source.

According to the above superdirectional acoustic system, in the sound signal supplied from the sound source, the medium-high frequency audio signal is reproduced by the ultrasonic speaker while the low frequency audio signal is reproduced by the low frequency sound reproducing speaker. Therefore, sound in the medium-high frequency range is reproduced in a manner such that the sound is produced from a virtual sound source which is formed in the vicinity of the sound signal reflection surface such as a screen, and sound in the low frequency sound range is directly reproduced from the low frequency sound reproducing speaker which is provided in the acoustic system. Accordingly, sound in the low frequency sound range can be enhanced, thereby producing sound field environments having improved sound presence.

The enhancement of the low frequency sound in this fashion is possible because low frequency sound has weak directivity and thus it is difficult to specify the position of its sound source. That is, even when the low frequency sound is produced from a position away from the position where the virtual sound source is produced (e.g., the position of the screen), it does not feel strange to the listener.

The present invention also provides a superdirectional acoustic system comprising:

a sound source for supplying a sound signal;

a signal isolating device for isolating an audio signal in a relatively medium to high frequency sound range and an audio signal in a relatively low frequency sound range from the sound signal;

an ultrasonic speaker for reproducing the isolated audio signal in the medium to high frequency sound range; and a low frequency sound reproducing speaker for reproducing the isolated audio signal in the low frequency sound range.

In this structure, a sound signal is supplied form the sound source, and from the sound signal, an audio signal in a relatively medium to high frequency sound range and an audio signal in a relatively low frequency sound range are isolated. The isolated audio signal in the medium to high frequency sound range is reproduced by the ultrasonic speaker, while the audio signal in the low frequency sound range is reproduced by the low frequency sound reproducing speaker. Therefore, sound in the medium-high frequency range is reproduced in a manner such that the sound is produced from a virtual sound source which is formed in the vicinity of the sound signal reflection surface such as a screen, and sound in the low frequency sound range is directly reproduced from the low frequency sound reproducing speaker which is provided in the acoustic system. Accordingly, sound in the low frequency sound range can be enhanced, thereby producing sound field environments having improved sound presence.

In the above structure, the ultrasonic speaker may include:

a carrier wave supplying device for generating and outputting a carrier wave in an ultrasonic frequency band;

a modulating device for modulating the carrier wave by the isolated audio signal in the medium to high frequency sound range; and an ultrasonic transducer for oscillating an ultrasonic wave, wherein the ultrasonic transducer, driven by a modulated signal output from the modulating device, converts the modulated signal to a sound wave having a finite amplitude level and emits the sound wave toward a medium.

In this case, a carrier wave in an ultrasonic frequency band is generated by the carrier wave supplying device and is modulated by the isolated audio signal in the medium to high frequency sound range. The ultrasonic transducer for oscillating an ultrasonic wave, driven by the modulated signal output from the modulating device, converts the modulated signal to a sound wave having a finite amplitude level and emits the sound wave toward a medium, so as to reproduce a sound signal in an audio frequency band.

Accordingly, the relatively medium to high frequency sound is reproduced with high fidelity and projected from a virtual sound source which is formed in the vicinity of a sound wave reflecting surface such as a screen.

Preferably, the carrier wave has a frequency which is determined by designating an arrival distance of the sound wave, measured from a sound wave emitting surface of the ultrasonic transducer along an emission axis to an arrival point of the sound wave.

Typically, the medium is air.

The present invention also provides a projector comprising:

an ultrasonic speaker for reproducing an audio signal in an audio frequency sound range, which is included in a sound signal supplied from a sound source, wherein the ultrasonic speaker includes an ultrasonic transducer for oscillating a sound wave in an ultrasonic frequency band;

a projector main portion having a projection optical system for projecting an image onto a projection surface; and a low frequency sound reproducing speaker, wherein:

an audio signal in a relatively medium to high frequency sound range, which is included in the sound signal supplied from the sound source, is reproduced by the ultrasonic speaker; and an audio signal in a relatively low frequency sound range, which is included in the sound signal supplied from the sound source, is reproduced by the low frequency sound reproducing speaker.

According to the projector, in the sound signal supplied from the sound source, the medium-high frequency audio signal is reproduced by the ultrasonic speaker while the low frequency audio signal is reproduced by the low frequency sound reproducing speaker. Therefore, sound in the medium-high frequency range is reproduced in a manner such that the sound is produced from a virtual sound source which is formed in the vicinity of the sound signal reflection surface such as a screen, and sound in the low frequency sound range is directly reproduced from the low frequency sound reproducing speaker which is provided at the projector. Accordingly, sound in the low frequency sound range can be enhanced, thereby producing sound field environments having improved sound presence.

The present invention also provides a projector comprising:

a sound source for supplying a sound signal;

a signal isolating device for isolating an audio signal in a relatively medium to high frequency sound range and an audio signal in a relatively low frequency sound range from the sound signal;

an ultrasonic speaker for reproducing the isolated audio signal in the medium to high frequency sound range;

a low frequency sound reproducing speaker for reproducing the isolated audio signal in the low frequency sound range; and a projector main portion having a projection optical system for projecting an image onto a projection surface.

In this structure, a sound signal is supplied form the sound source, and from the sound signal, an audio signal in a relatively medium to high frequency sound range and an audio signal in a relatively low frequency sound range are isolated. The isolated audio signal in the medium to high frequency sound range is reproduced by the ultrasonic speaker, while the audio signal in the low frequency sound range is reproduced by the low frequency sound reproducing speaker. Therefore, sound in the medium-high frequency range is reproduced in a manner such that the sound is produced from a virtual sound source which is formed in the vicinity of the sound signal reflection surface such as a screen, and sound in the low frequency sound range is directly reproduced from the low frequency sound reproducing speaker which is provided in the acoustic system. Accordingly, sound in the low frequency sound range can be enhanced, thereby producing sound field environments having improved sound presence.

In the above structure, the ultrasonic speaker may include:

a carrier wave supplying device for generating and outputting a carrier wave in an ultrasonic frequency band;

a modulating device for modulating the carrier wave by the isolated audio signal in the medium to high frequency sound range; and an ultrasonic transducer for oscillating an ultrasonic wave, wherein the ultrasonic transducer, driven by a modulated signal output from the modulating device, converts the modulated signal to a sound wave having a finite amplitude level and emits the sound wave toward a medium.

Accordingly, the relatively medium to high frequency sound is reproduced with high fidelity and projected from a virtual sound source which is formed in the vicinity of a sound wave reflecting surface such as a screen.

The carrier wave may have a frequency which is determined by designating an arrival distance of the sound wave, measured from a sound wave emitting surface of the ultrasonic transducer along an emission axis to an arrival point of the sound wave. Typically, the medium is air.

BEST MODE FOR CARRYING OUT THE INVENTION

Hereinbelow, an embodiment of the present invention will be explained in detail with reference to the drawings.

The superdirectional acoustic system according to the present invention reproduces a sound signal supplied from a real sound source, by using a superdirectional speaker, and produces a virtual sound source in the vicinity of a sound wave reflection surface such as a screen. The superdirectional acoustic system has (i) an ultrasonic speaker, which includes an ultrasonic transducer which can oscillate a sound wave in an ultrasonic frequency band, for reproducing an audio signal in a medium to high frequency sound range, which is included in the sound signal supplied from the real sound source, and (ii) a low frequency sound reproducing speaker for reproducing an audio signal in a low frequency sound range, which is also included in the sound signal supplied from the real sound source.

Below, the projector as an embodiment of the superdirectional acoustic system according to the present invention will be explained.

Figure 1:
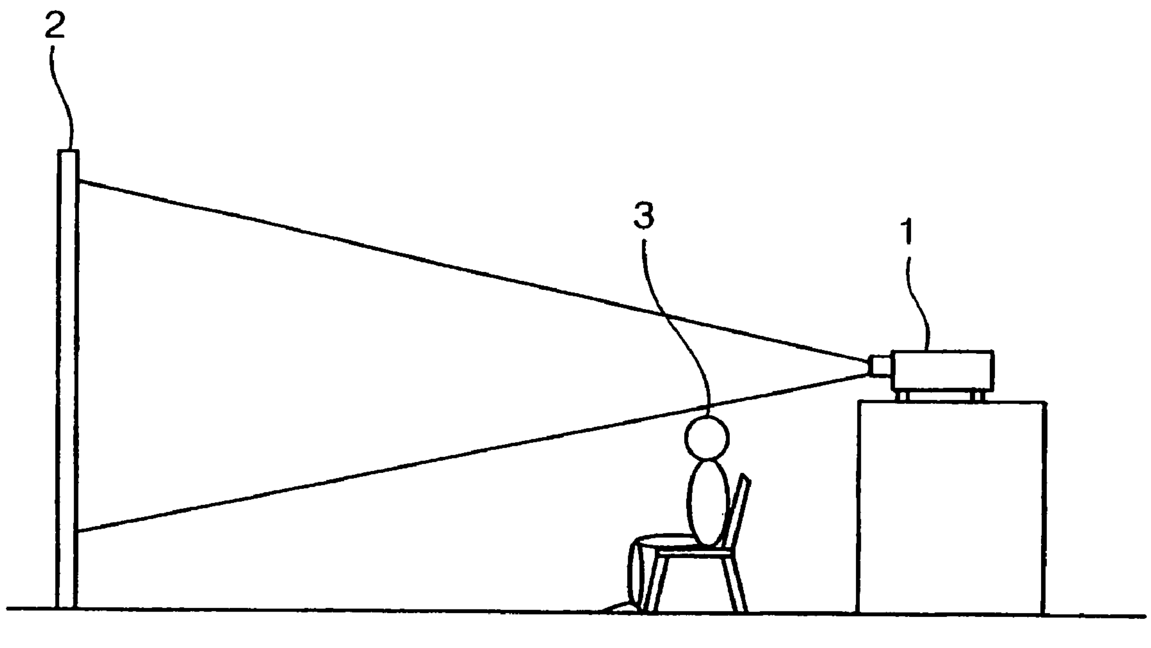
FIG. 1 is a diagram showing the projector in an embodiment according to the present invention in use.

FIG. 1 shows the projector in the embodiment in use. As shown in the figure, the projector 1 is provided behind a viewer/listener 3, so as to project images onto a screen 2 in front of the viewer/listener 3. Simultaneously, a virtual sound source is produced on a projection surface of the screen 2 by an ultrasonic speaker built in the projector 1, so as to reproduce sound.

Figure 2A:
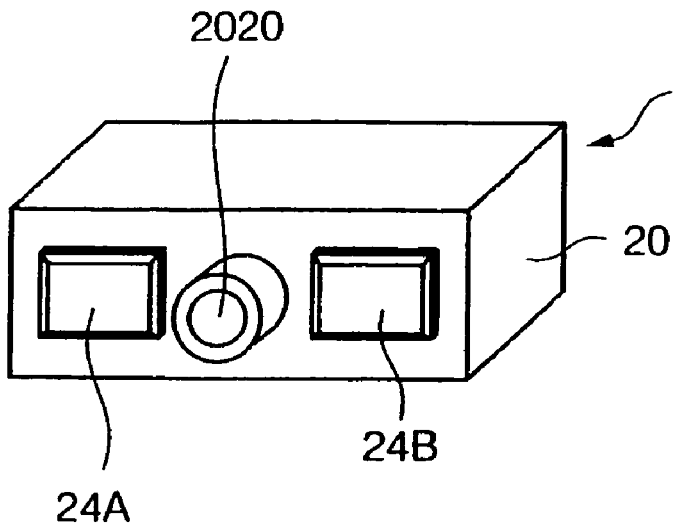
FIGS. 2A and 2B are perspective views showing the apparent structure of the projector in FIG. 1.
Figure 2B:
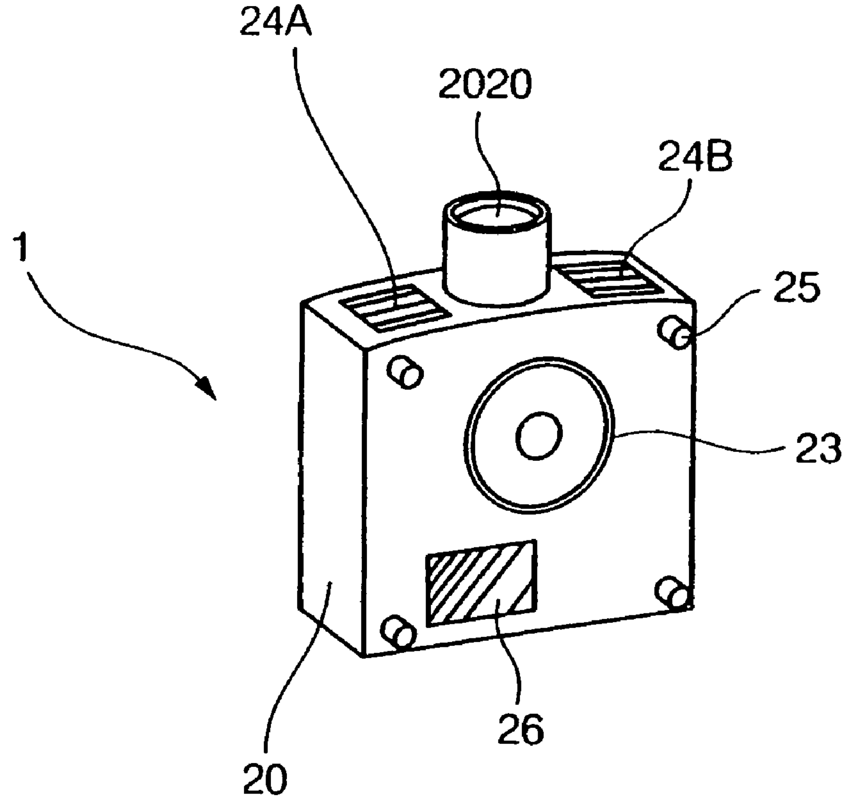

The apparent structure of the projector 1 is shown in FIGS. 2A and 2B. The projector 1 includes (i) a projector main portion 20 including a projection optical system for projecting images onto a projection surface such as a screen, and (ii) an ultrasonic speaker which includes an ultrasonic transducer 24 (here, includes ultrasonic transducers 24A and 24B) which can oscillate a sound wave in an ultrasonic frequency band and which reproduces an audio signal in an audio frequency band, which is originally included in a sound signal supplied from a sound source. The projector main portion 20 and the ultrasonic speaker are integrally constructed as the projector 1.

In the present embodiment, in order to reproduce a stereo sound signal, the ultrasonic transducers 24A and 24B, which function as ultrasonic speakers, are mounted on the projector main portion 20, where a projector lens 2020 for the projection optical system is provided between the ultrasonic transducers 24A and 24B, one of which is disposed at the right and the other of which is disposed at the left.

On the bottom face of the projector main portion 20, a low frequency sound reproducing speaker 23 is provided. Reference numeral 25 indicates a height adjusting screw for adjusting the height of the projector main portion 20, and reference numeral 26 indicates an exhaust opening for a cooling fan.

The projector according to the present invention employs ultrasonic transducers (functioning as ultrasonic speakers), each can oscillate a sound signal in a wide frequency range (here, each can oscillate a sound wave in an ultrasonic frequency band), so as to change the frequency of the carrier wave and control the spatial reproduction area of the reproduced signal in an audio frequency band. Accordingly, sound effects which can be obtained by a stereo surround system or a 5.1ch surround system can be realized without a large-scale audio system which is conventionally necessary, and it is also easy to carry the projector.

Figure 3:
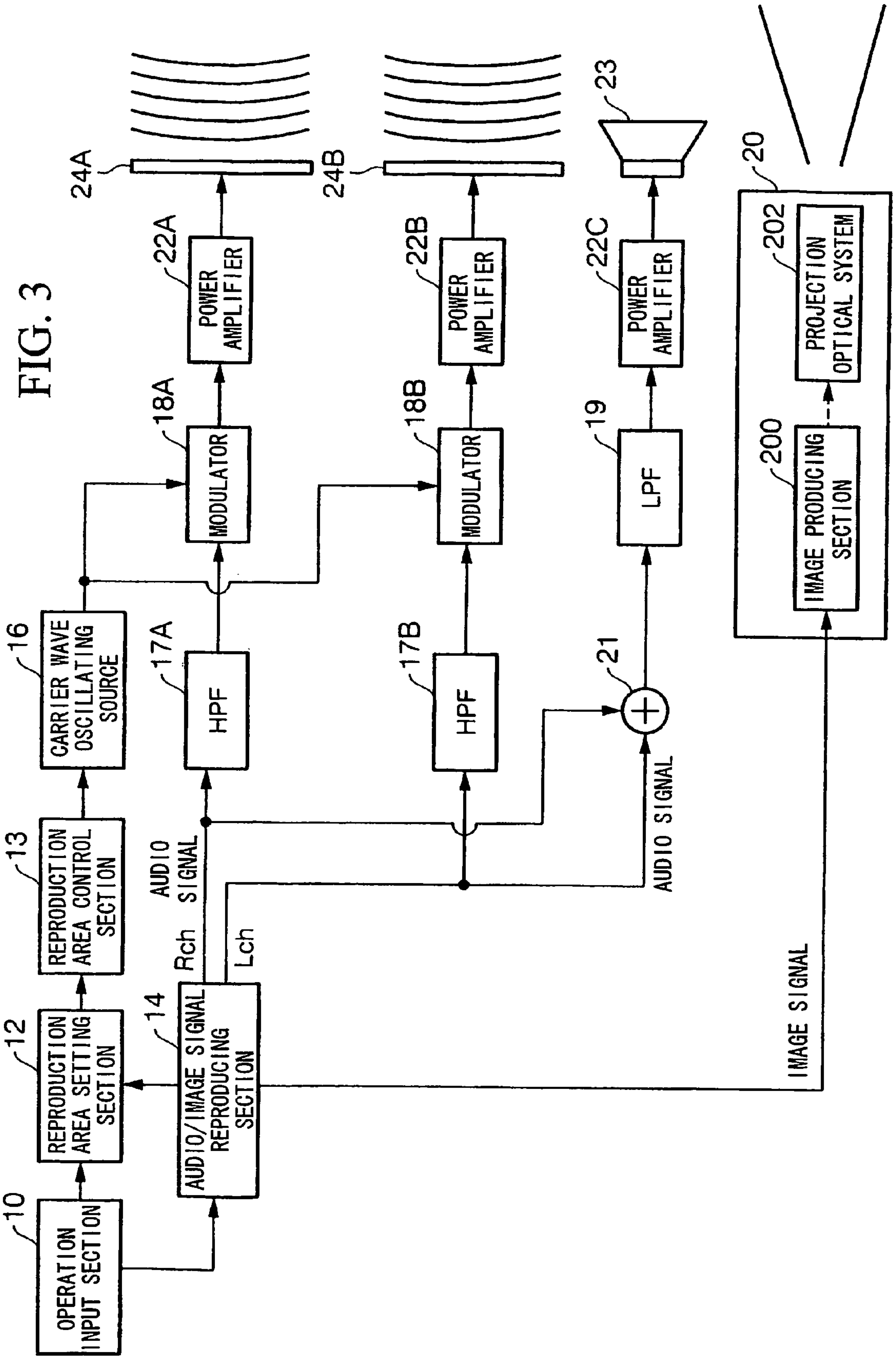
FIG. 3 is a block diagram showing the electric structure of the projector in FIG. 1.

FIG. 3 shows the electric structure of the projector in the present embodiment. The projector 1 of the present embodiment includes an operation input section 10, a reproduction area setting section 12, a reproduction area control section 13, an audio/image signal reproducing section 14, an ultrasonic speaker including a carrier wave oscillating source 16, modulators 18A and 18B, power amplifiers 22A and 22B, and ultrasonic transducers 24A and 24B, high-pass filters 17A and 17B, a low-pass filter 19, an adder 21, a power amplifier 22C, a low frequency sound reproducing speaker 23, and the projector main portion 20.

The projector main portion 20 includes an image producing section 200 for producing images and a projection optical system 202 for projecting produced images onto a projection surface.

In the projector 1 of the present embodiment, the ultrasonic speaker, the low frequency sound reproducing speaker 23, and the projector main portion 20 are formed as one unit.

The operation input section 10 has various functional keys including ten keys, numerical keys, and a power key (or button) for switching the power on and off.

The reproduction area setting section 12 is provided for input by a user, who operates the keys of the operation input section 10, to input data for designating a reproduction area of the reproduced signal (i.e., a reproduced sound signal or a signal sound). When such data is input into the reproduction area setting section 12, the frequency of the carrier wave for determining the reproduction area of the reproduced signal is set and stored (as explained below). Specifically, the determination of the reproduction area of the reproduced signal is performed by designating a range or an arrival distance of the reproduced signal from the sound wave emitting surface of the ultrasonic transducers 24A and 24B along the emission axis to an arrival point.

The reproduction area setting section 12 also receives a control signal which is output from the audio/image signal reproducing section 14 in accordance with the image contents, so as to determine the frequency of the carrier wave.

The reproduction area control section 13 refers to the data set in the reproduction area setting section 12 and controls the carrier wave oscillating source 16 so as to realize the designated reproduction area by changing the frequency of the carrier wave generated by the carrier wave oscillating source 16.

For example, when the arrival distance corresponding to a frequency of the carrier wave of 50 kHz is defined as the data set in the reproduction area setting section 12, the carrier wave oscillating source 16 is controlled to oscillate at 50 kHz.

The reproduction area control section 13 includes a storage section for storing a table which indicates relationships between the frequency of the carrier wave and the arrival distance of the reproduced signal from the sound wave emitting surface of the ultrasonic transducers 24A and 24B along the emission axis to an arrival point. The data of this table can be obtained by actually measuring the relationships between the frequency of the carrier wave and the arrival distance of the reproduced signal.

Based on the data defined in the reproduction area setting section 12, the reproduction area control section 13 obtains the frequency of the carrier wave corresponding to the defined distance data by referring to the table, and controls the carrier wave oscillating source 16 so as to oscillate at obtained frequency.

The audio/image signal reproducing section 14 is, for example, a DVD player which uses a DVD as an image storage medium. The reproduced audio signal includes an R-channel audio signal and an L channel audio signal which are respectively output to the modulator 18A via the high-pass filter 17A and the modulator 18B via the high-pass filter 17B, and the image signal is output to the image producing section 200 of the projector main portion 20.

Simultaneously, the R-channel and L-channel audio signals output from the audio/image signal reproducing section 14 are synthesized using the adder 21 and the added signal is input via the low-pass filter 19 into the power amplifier 22C. The audio/image signal reproducing section 14 corresponds to the sound source of the present invention.

The high-pass filter 17A has characteristics of making only a medium-high (i.e., medium to high) frequency component of the R-channel audio signal pass through the filter, and similarly, the high-pass filter 17B has characteristics of making only a medium-high frequency component of the L-channel audio signal pass through the filter. The low pass filter 19 has characteristics of making only low frequency components of the R-channel and L-channel audio signal pass through the filter.

Therefore, the medium-high frequency audio signals included in the R-channel and L-channel audio signals are respectively reproduced by the ultrasonic transducers 24A and 24B, and the low-frequency audio signals included in the R-channel and L-channel audio signals are reproduced by the low frequency sound reproducing speaker 23.

In the present embodiment, the audio/image signal reproducing section 14 is a DVD player; however, this is not a limiting feature. The audio/image signal reproducing section 14 may be any reproduction device for reproducing a video signal input from an external device.

In order to dynamically change the reproduction area of the reproduced sound so as to producing a sound effect suitable for a reproduced image scene, the audio/image signal reproducing section 14 has a function of outputting a control signal for designating the reproduction area to the reproduction area setting section 12.

The carrier wave oscillating source 16 generates a carrier wave having a frequency in an ultrasonic frequency band, as designated by the reproduction area setting section 12, and outputs the generated carrier wave to the modulators 18A and 18B.

The modulators 18A and 18B subject the carrier wave supplied from the carrier wave oscillating source 16 to AM modulation using an audio signal in an audio frequency band output from the audio/image signal reproducing section 14, and the modulated signals are respectively output to the power amplifiers 22A and 22B.

The ultrasonic transducers 24A and 24B are respectively driven by the modulated signals output via the power amplifiers 22A and 22B from the modulators 18A and 18B. Each ultrasonic transducer has a function of converting the modulated signal to a sound wave having a finite amplitude level and emitting the sound wave into a medium, so as to reproduce an audio signal (i.e., a reproduced signal) in an audio frequency band.

The ultrasonic transducers 24A and 24B are, for example, electrostatic transducers which can oscillate sound signals in a wide frequency range (i.e., ultrasonic waves). The ultrasonic transducers 24A and 24B are not limited to the electrostatic transducers, but they should oscillate sound signals in a wide frequency range.

The image producing section 200 includes a display such as an LCD (liquid crystal display) or a PDP (plasma display panel), a drive circuit for driving the display based on the image signal output from the audio/image signal reproducing section 14, etc. Therefore, the image producing section 200 produces an image obtained by the image signal which is output from the audio/image signal reproducing section 14.

The projection optical system 202 has a function of projecting the image (displayed on the display) onto a projection surface such as a screen, provided in front of the projector main portion 20.

Figure 4:
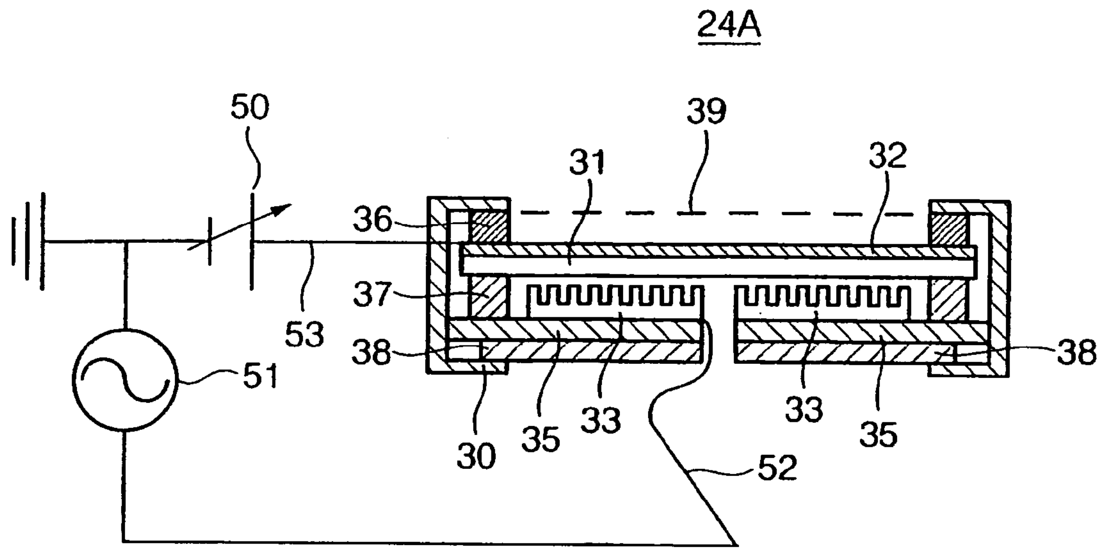
FIG. 4 is a diagram showing the specific structure of the ultrasonic transducer in FIG. 3.

The specific structure of the ultrasonic transducer 24A is shown in FIG. 4. The ultrasonic transducer 24B has a similar structure, and thus only the ultrasonic transducer 24A is shown here. The electrostatic ultrasonic transducer shown in FIG. 4 has a dielectric (material) 31 (i.e., an insulator) such as a PET (polyethylene terephthalate) resin having a thickness of approximately 3 to 10 μm, as a vibrator. On the upper surface of the dielectric 31, an upper electrode 32, which is a foil made of a metal such as aluminum, is integrally formed by vapor deposition or the like. In addition, a lower electrode 33 made of brass is provided, which contacts the lower surface of the dielectric 31 (in FIG. 4, the lower electrode 33 is depicted not contacting the lower surface for the sake of making the form of the electrode apparent). A lead 52 is connected to the lower electrode 33, and the lower electrode 33 is fastened to a base plate 35 made of Bakelite (a registered trademark of the Union Carbide Corporation) or the like.

A lead 53 is connected to the upper electrode 32 and a DC (direct current) bias supply 50. According to this DC bias supply 50, a DC bias voltage of approximately 50 to 150 V is continually applied to the upper electrode, so that the upper electrode 32 is attracted to the lower electrode 33. Reference numeral 51 indicates an AC (alternating current) signal source which corresponds to the output (in this case, AC of about 50 to 150 Vp-p) of the power amplifier 22A in FIG. 3.

The dielectric 31, the upper electrode 32, and the base plate 35 are fixedly enclosed in a case 30, together with metal rings 36, 37, and 38, and a mesh 39.

Figure 5:
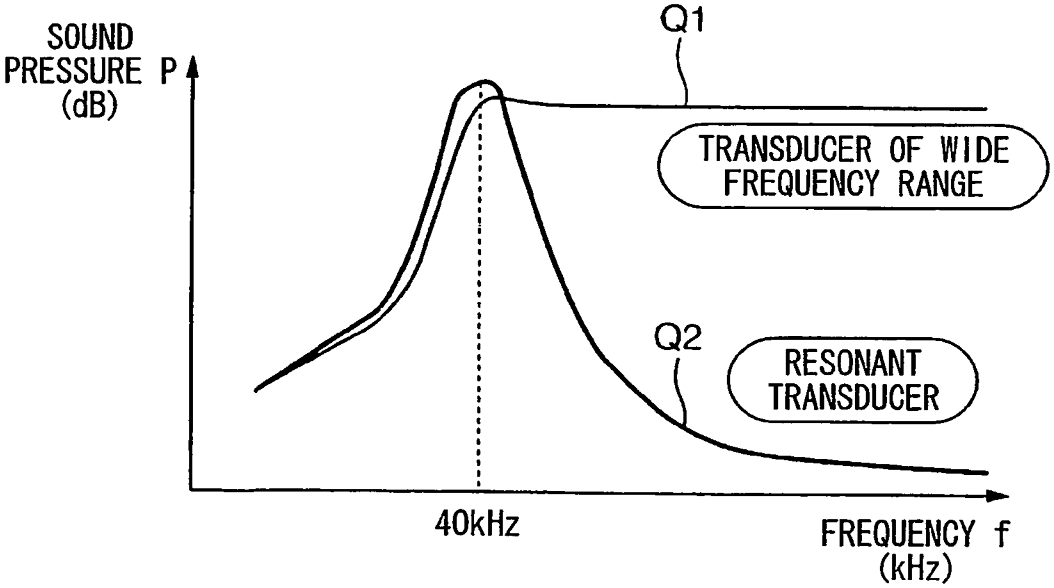
FIG. 5 is a graph showing frequency characteristics of the ultrasonic transducer in FIG. 4.

On a surface of the lower electrode 33, which faces the dielectric 31, microgrooves having a (groove) width of approximately a few tens to a few hundreds of micrometers and having irregular forms are formed. The microgrooves function as gaps between the lower electrode 33 and the dielectric 31, which slightly change the distribution of electric capacitance between the upper electrode 32 and the lower electrode 33. Such microgrooves having irregular forms are formed by randomly scoring the surface of the lower electrode 33 with a file. Accordingly, the electrostatic ultrasonic transducer has an enormous number of capacitors having gaps whose areas and depths are not uniform, thereby rendering the ultrasonic transducer capable of producing sound in a wide frequency range in the frequency characteristics (see curve Q1 in FIG. 5).

In the ultrasonic transducer 24 having the above-explained structure, a modulated signal (i.e., the output from the power amplifier 22 (i.e., 22A or 22B)) is applied between the upper electrode 32 and the lower electrode 33 while the DC bias voltage is applied to the upper electrode 32. In a generic resonant ultrasonic transducer (see curve Q2 in FIG. 5), the center frequency (i.e., the resonance frequency of the piezoceramic element) is, for example, 40 kHz. At ±5 kHz from the center frequency (at which the maximum sound pressure is obtained), −30 dB from the maximum sound pressure is obtained. In contrast, in the frequency characteristics of the above-explained ultrasonic transducer of a wide frequency range, a flat characteristic is obtained approximately from 40 kHz to 100 kHz, and at 100 kHz, −6 dB from the maximum sound pressure is obtained.

Below, the operation of the projector 1 having the above structure will be explained. According to a key operation by a user, data for designating a reproduction area of the reproduced signal (i.e., distance data) is input from the operation input section 10 to the reproduction area setting section 12, and a signal for instructing reproduction is output to the audio/image signal reproducing section 14.

As a result, the distance data for defining the reproduction area is set in the reproduction area setting section 12, and the reproduction area control section 13 obtains the distance data set in the reproduction area setting section 12 and refers to the table stored in its inner storage, so as to determine the carrier frequency corresponding to the distance data. The reproduction area control section 13 then controls the carrier wave oscillating source 16 so as to generate a carrier wave having the above frequency.

Accordingly, the carrier wave oscillating source 16 generates a carrier wave having a frequency corresponding to the distance data set in the reproduction area setting section 12, and outputs the generated carrier wave to the modulators 18A and 18B.

On the other hand, the audio/image signal reproducing section 14 outputs the reproduced audio and image signals, that is, outputs (i) the R-channel audio signal via the high-pass filter 17A to the modulator 18A, (ii) the L-channel audio signal via the high-pass filter 17B to the modulator 18B, (iii) the R-channel and L-channel audio signals to the adder 21, and (iv) the image signal to the image generating section 200 of the projector main portion 20.

Accordingly, the medium-high frequency audio signal included in the R-channel audio signal is input into the modulator 18A via the high-pass filter 17A, and the medium-high frequency audio signal included in the L-channel audio signal is input into the modulator 18B via the high-pass filter 17B. In addition, the R-channel and L-channel audio signals are synthesized by the adder 21, and the low frequency audio signal included in the added signal of the R-channel and L-channel audio signals is input to the power amplifier 22C via the low-pass filter 19.

In the image producing section 200, an image is produced by driving the display based on the input image signal and is displayed. The image displayed on the display is projected by the projection optical system 202 onto a projection surface, for example, the screen 2 in FIG. 1.

The modulator 18A subjects the carrier wave output from the carrier wave oscillating source 16 to AM modulation using the medium-high frequency audio signal which was included in the R-channel audio signal and was output from the high-pass filter 17A, and outputs the modulated signal to the power amplifier 22A.

The modulator 18B subjects the carrier wave output from the carrier wave oscillating source 16 to AM modulation using the medium-high frequency audio signal which was included in the L-channel audio signal and was output from the high-pass filter 17B, and outputs the modulated signal to the power amplifier 22B.

The modulated signals amplified by the power amplifiers 22A and 22B are applied between the upper electrode 32 and the lower electrode 33 of each of the ultrasonic transducers 24A and 24B, respectively, so that each modulated signal is converted to a sound wave (i.e., a sound signal) having a finite amplitude level. The converted signal is then emitted into a medium (i.e., the air). Accordingly, the medium-high frequency audio signal in the above R-channel audio signal is reproduced from the ultrasonic transducer 24A, and the medium-high frequency audio signal in the above L-channel audio signal is reproduced from the ultrasonic transducer 24B.

On the other hand, the low frequency audio signal, which was included in the R- and L-channels and was amplified by the power amplifier 22C, is reproduced from the low frequency sound reproducing speaker 23.

A non-linear effect of the medium (here, air), relating to the present invention, will be briefly explained here. As is known, in transmission of an ultrasonic wave emitted into the air by an ultrasonic transducer, the wave has a higher sound velocity if it has a higher sound pressure and a lower sound velocity if it has a lower sound pressure, thereby causing a distortion in the waveform of the transmitted wave.

When a signal in an ultrasonic frequency band (i.e., the carrier wave) to be emitted is AM-modulated in advance by a signal in an audio frequency band, the above-explained distortion in the waveform causes isolation of the signal wave in the audio frequency band, which was used in the modulation, from the carrier wave in the ultrasonic frequency band, thereby causing self-demodulation and reproduction of the above audio signal wave. Also in this process, the reproduced signal proceeds in the form of a beam due to the characteristics of the ultrasonic wave, so that sound is reproduced and projected in a specific direction. This is completely different from reproduction using ordinary speakers.

In the projector of the present embodiment, the beam-form reproduced signal, which is output from the ultrasonic transducer 24 (i.e., 24A or 24B) as a component of the ultrasonic speaker, is emitted into a projection surface (i.e., a screen), on which images are projected by the projection optical system 202, and is reflected and diffused by the projection surface. The distance from the face of the ultrasonic transducer 24A or 24B, from which the sound wave is emitted, to a position where the reproduced signal is isolated from the carrier wave, measured along the emission axis (i.e., the normal), and (ii) the width or the spread angle of the beam of the carrier wave are determined depending on the frequency of the carrier wave set in the reproduction area setting section 12. Therefore, the reproduction area changes in accordance with a difference in the above distance and the beam width.

Figure 6:
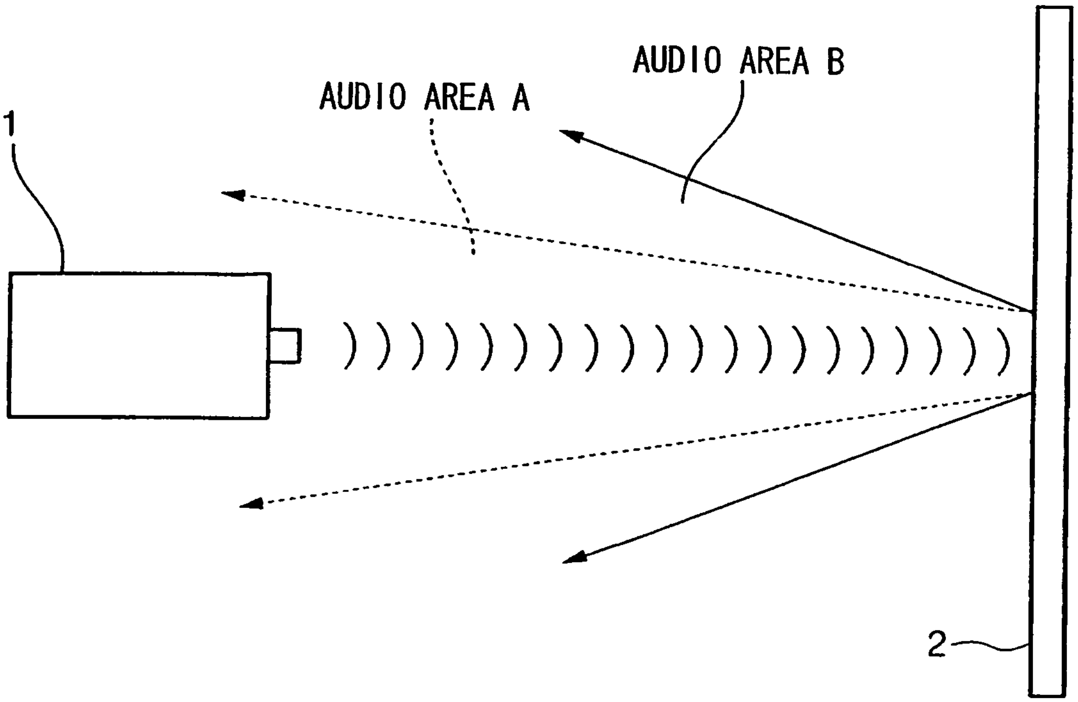
FIG. 6 is a diagram showing examples of reproduction of the reproduced signal by using the ultrasonic transducers provided in the projector in the embodiment.
Figure 7:
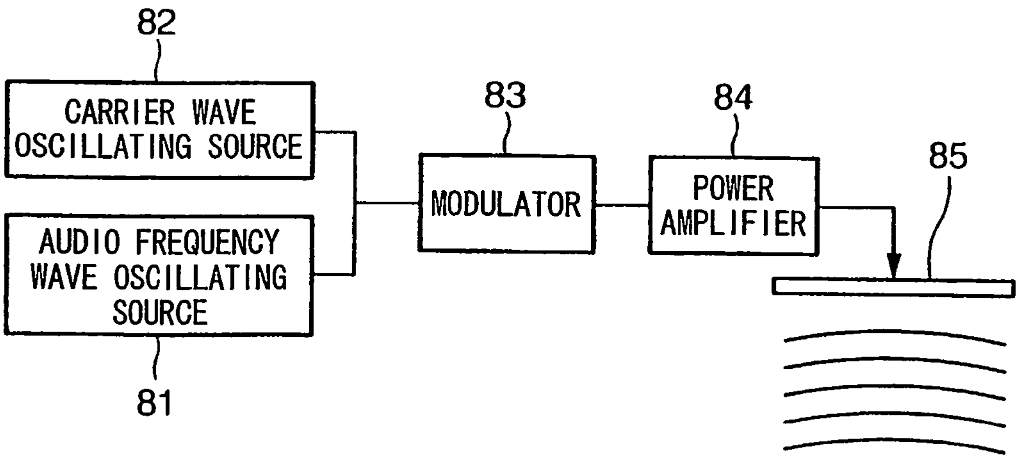
FIG. 7 is a diagram showing the specific structure of a conventional ultrasonic speaker.
Figure 8A:
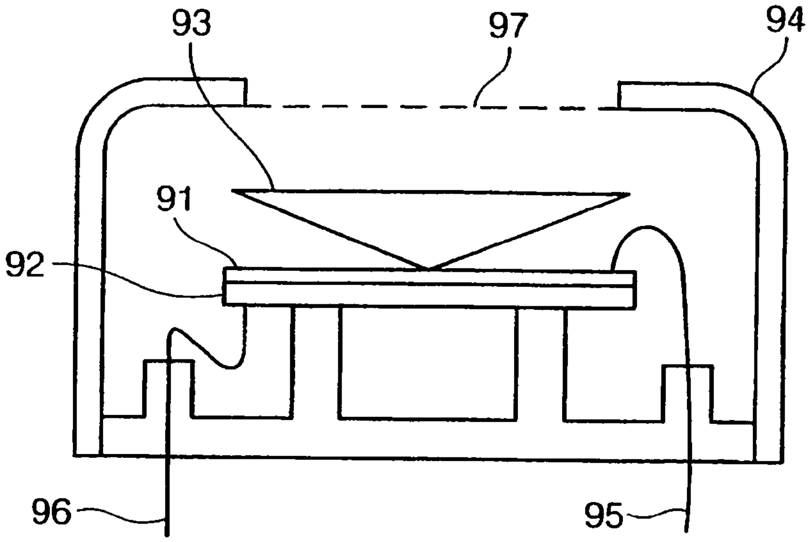
FIGS. 8A and 8B are diagrams showing the structures of resonant ultrasonic transducers.
Figure 8B:
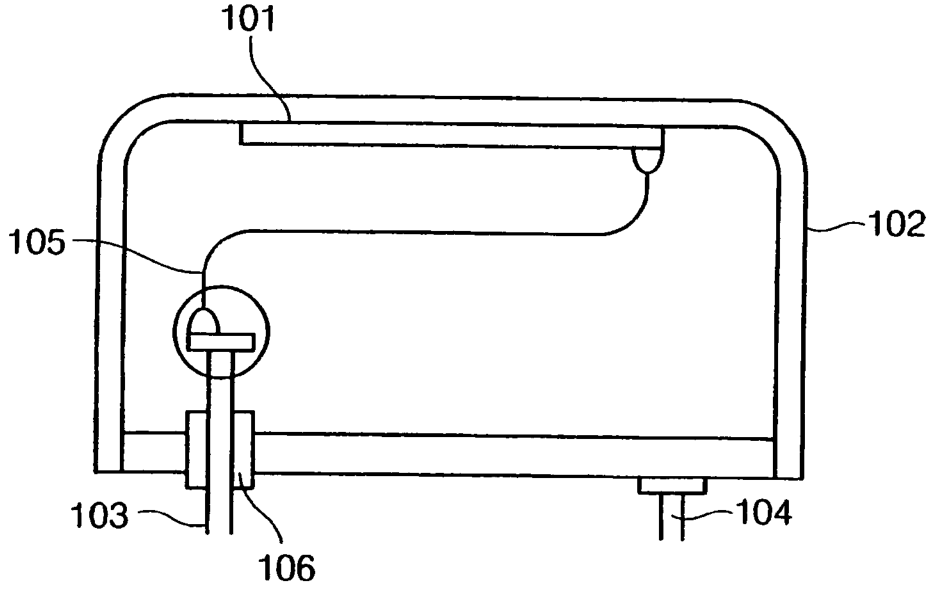

FIG. 6 shows examples of reproduction of the reproduced signal by using the ultrasonic speaker realized by the ultrasonic transducers 24A and 24B in the projector of the present embodiment.

When the ultrasonic transducers are driven by the modulated signals (obtained by modulating the carrier wave by an audio signal) in the projector 1, if the carrier frequency set via the reproduction area setting section 12 is low, the distance from the sound wave emitting surface of the ultrasonic transducer 24, to a position where the reproduced signal is isolated from the carrier wave, measured along the emission axis (i.e., the normal with respect to the sound wave emitting surface), that is, the distance up to the reproduction point, is relatively long.

Therefore, the beam of the reproduced signal in an audio frequency band reaches the projection surface (i.e., the screen 2) while the spread of the beam is relatively small. When this reproduced signal is reflected by the projection surface, the reproduction area indicated by dotted arrows in FIG. 6 is obtained (see "audio area A"), so that the reproduced signal, that is, the reproduced sound, can be heard only in an area which is relatively far from the projection surface and relatively narrow.

Conversely, when the carrier frequency set via the reproduction area setting section 12 is higher than that in the above case, the sound wave emitted from the sound wave emitting surface of the ultrasonic transducer 24 is narrower than that in the case of using a lower carrier frequency; however, the distance from the sound wave emitting surface to a position where the reproduced signal is isolated from the carrier wave, measured along the emission axis (i.e., the normal with respect to the sound wave emitting surface), that is, the distance up to the reproduction point, is relatively short.

Therefore, the beam of the reproduced signal in an audio frequency band spreads before reaching the projection surface (i.e., the screen 2). When this reproduced signal reaches and is reflected by the projection surface, the reproduction area indicated by solid arrows in FIG. 6 is obtained (see "audio area B"), so that the reproduced signal, that is, the reproduced sound can be heard only in an area which is relatively close to the projection surface and is relatively wide.

According to the projector of the present embodiment, in the sound signal supplied from the sound source, the medium-high frequency audio signal is reproduced by the ultrasonic speaker while the low frequency audio signal is reproduced by the low frequency sound reproducing speaker. Therefore, sound in the medium-high frequency range is reproduced in a manner such that the sound is produced from a virtual sound source which is formed in the vicinity of the sound signal reflection surface such as a screen, and sound in the low frequency sound range is directly reproduced from the low frequency sound reproducing speaker which is provided at the projector. Accordingly, sound in the low frequency sound range can be enhanced, thereby producing sound field environments having improved sound presence.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

INDUSTRIAL APPLICABILITY

The superdirectional acoustic system can be applied not only to the projector but also to various acoustic systems such as stereo acoustic systems, 5.1ch acoustic systems, and the like.

The invention claimed is:

1. A superdirectional acoustic system comprising:

a sound source for supplying an audio sound signal;

a signal isolating device for isolating an audio signal in a medium to high frequency sound range and an audio signal in a low frequency sound range from the audio sound signal supplied by the sound source;

a carrier wave supplying device for generating and outputting a carrier wave in an ultrasonic frequency band;

a modulating device for modulating the carrier wave by the isolated audio signal in the medium to high frequency sound range, and outputting a modulated signal;

an ultrasonic speaker for reproducing the audio signal in the medium to high frequency sound range by using an ultrasonic transducer which converts the modulated signal into a sound wave having a finite amplitude level; and a low frequency sound reproducing speaker for reproducing the isolated audio signal in the low frequency sound range, wherein the modulating device does not modulate the carrier wave by the low frequency signal.

2. A superdirectional acoustic system as claimed in claim 1, wherein the ultrasonic transducer emits the converted sound wave having the finite amplitude level toward a medium.

3. A superdirectional acoustic system as claimed in claim 2, wherein the carrier wave has a frequency which is determined by designating an arrival distance of the sound wave, measured from a sound wave emitting surface of the ultrasonic transducer along an emission axis to an arrival point of the sound wave.

4. A superdirectional acoustic system as claimed in claim 2, wherein the medium is air.

5. A projector comprising:

a sound source for supplying an audio sound signal;

a signal isolating device for isolating an audio signal in a medium to high frequency sound range and an audio signal in a low frequency sound range from the audio sound signal supplied by the sound source;

a carrier wave supplying device for generating and outputting a carrier wave in an ultrasonic frequency band;

a modulating device for modulating the carrier wave by the isolated audio signal in the medium to high frequency sound range, and outputting a modulated signal;

an ultrasonic speaker for reproducing the audio signal in the medium to high frequency sound range by using an ultrasonic transducer which converts the modulated signal into a sound wave having a finite amplitude level;

a low frequency sound reproducing speaker for reproducing the isolated audio signal in the low frequency sound range, wherein the modulating device does not modulate the carrier wave by the low frequency signal; and a projector main portion having a projection optical system for projecting an image onto a projection surface.

6. A projector as claimed in claim 5, wherein the ultrasonic transducer emits the converted sound wave having the finite amplitude level toward a medium.

7. A projector as claimed in claim 6, wherein the carrier wave has a frequency which is determined by designating an arrival distance of the sound wave, measured from a sound wave emitting surface of the ultrasonic transducer along an emission axis to an arrival point of the sound wave.

8. A projector as claimed in claim 6, wherein the medium is air.

* * * * *